3,246,975
1-CYCLOBUTYLFORMAMIDES AND USE AS HERBICIDES
Thomas R. Hopkins, Overland Park, and Ralph P. Neighbors, Olathe, Kans., assignors, by mesne assignments, to Gulf Oil Corporation, Pittsburgh, Pa., a corporation of Pennsylvania
No Drawing. Filed Mar. 16, 1962, Ser. No. 180,310
4 Claims. (Cl. 71—2.5)

This invention relates to novel compositions and methods for controlling plant growth, and more particularly, this invention relates to compositions and methods for inhibiting plant growth employing as the active plant growth regulator, a 1-cyclobutylformamide.

There are provided by this invention novel herbicidal compositions and methods for controlling plant growth by applying to the locus of the plant a 1-cyclobutylformamide. The 1-cyclobutylformamides of this invention are the cyclobutanecarboxamides and the 1-cyclobutylthioformamides which are represented by the formula

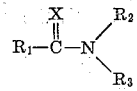

wherein $R_1$ represents a cyclobutyl ring, X represents oxygen or sulfur, and $R_2$ and $R_3$ are selected from the group consisting of hydrogen, alkyl, cycloalkyl, alkenyl, alkynyl, aryl, aralkyl, heterocyclic, and taken together with the nitrogen atom to which $R_2$ and $R_3$ are attached, a heterocyclic radical. Thus, the herbicidal 1-cyclobutylformamides of this invention are the unsubstituted amides or amides having one or more organic substituents on the nitrogen atom. Preferably, $R_2$ is hydrogen and $R_3$ is a monocyclic aryl group such as phenyl and the nuclear substituted phenyl groups.

Examples of nitrogen substituents represented by $R_2$ and $R_3$ in the above formula are alkyl radicals, and especially the lower alkyl radicals having one to about eight carbon atoms, straight or branched chain; cycloalkyl radicals, especially the cyclic lower alkyl radicals having about three to eight carbon atoms; alkenyl and alkynyl radicals, and especially the lower alkenyl and alkynyl radicals having two to about eight carbon atoms; aralkyl radicals and especially the monocyclic aralkyl radicals such as benzyl and nuclear substituted benzyls; aryl radicals, and especially the monocyclic aryl radicals such as phenyl and nuclear substituted phenyls having nuclear substituents such as halo, and especially chloro, iodo, fluoro and bromo, alkoxy and especially lower alkoxy, cyano, nitro, alkyl and especially lower alkyl, acyloxy and hydroxy; and heterocyclic radicals, especially monocyclic radicals having nitrogen, oxygen or sulfur in addition to carbon in the ring. $R_2$ and $R_3$ may also be taken together with the nitrogen atom to form a heterocyclic radical, such as the monocyclic radicals having nitrogen, oxygen or sulfur in addition to carbon in the ring, for example the amides formed from piperidine or morpholine.

Representative examples of radicals represented by $R_2$ and $R_3$ in the above formula are hydrogen, methyl, ethyl, 2-chloroethyl, 2-hydroxyethyl, propyl, isobutyl, pentyl, isooctyl, allyl, butenyl, pentenyl, butynyl, 4-chloro-2-butynyl, propynyl, phenyl, naphthyl, 3-chlorophenyl, 3-iodophenyl, 3-fluorophenyl, 4-bromophenyl, 3,4-dichlorophenyl, 2,4,5-trichlorophenyl, 3-methylphenyl, 3,4-dibromophenyl, 2,5-difluorophenyl, 4-cyanophenyl, 3,5-dinitrophenyl, 4-hydroxyphenyl, 3-chloro-4-methylphenyl, 4-acetoxyphenyl, 3-methoxyphenyl, 3-trifluoromethylphenyl, cyclopropyl, cyclohexyl, cyclobutyl, 4-cyclopropylcarbonyloxyphenyl, benzyl, 3,4-dichlorobenzyl, 2-thiazolyl, 2-pyridyl, and triazolyl. Compounds having a cyclic radical in which the amide nitrogen atom is part of the ring are formed from compounds such as piperidine, morpholine and pyrrolidine.

There are also provided by this invention certain novel 1-cyclobutylformamides. Especially useful are the cyclobutanecarboxamides having the formula

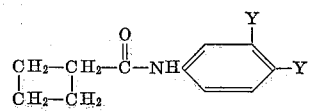

in which Y represents hydrogen, halo or methyl radicals, at least one of said Y's being a halo radical. The halo radical may be any halogen, such as chloro, bromo, iodo or fluoro.

The cyclobutanecarboxamides of this invention are readily prepared by reaction of cyclobutanecarboxylic acid halide, such as the acid chloride (cyclobutanecarbonyl chloride), with the appropriate amine. Preferably, the reaction is run in the presence of an inert organic solvent such as cyclohexane, toluene, dioxane, benzene, n-hexane or n-pentane. Since hydrogen halide is a by-product of the reaction, it is desirable to use a molar excess of the amine or, preferably, a tertiary amine such as triethylamine or pyridine, to react with the hydrogen halide as it is evolved, thereby improving yields and purity of the desired product. The reaction takes place in a relatively short time, about 0.5 to 3 hours usually being sufficient at about room temperature or slightly below room temperature. A preferred reaction temperature is around 15 to 25° C., which is low enough to maintain good control of the reaction. In order to make full use of the reactants, it is preferred to add the cyclobutanecarboxylic acid halide to a solution of the amine and pyridine in an organic solvent, thus maintaining an excess of amine during the reaction period. When an organic solvent for the carboxamide is used, the by-product pyridine hydrohalide can be removed by filtration and the desired carboxamide isolated from the solvent by known procedures. The crude amide can be recrystallized, such as from water-alcohol mixtures, n-hexane or ethyl acetate, in the case of solids and in the case liquids, can be distilled under reduced pressure.

The 1-cyclobutylthioformamides can be prepared by sulfurization of the corresponding cyclobutanecarboxamide with phosphorus pentasulfide at an elevated temperature, such as about 90–110° C.

The following examples illustrate the preparation of representative 1-cyclobutylformamides of this invention, but are not intended to limit the invention.

EXAMPLE 1.—N-(3,4-DICHLOROPHENYL) CYCLOBUTANECARBOXAMIDE

A solution of 6.82 grams (0.042 mole) of 3,4-dichloroaniline and 3.32 grams (0.042 mole) of pyridine in 50 ml. of benzene was stirred in a flask and cooled to about 15° C. A solution of 5 grams (0.042 mole) of cyclobutanecarboxylic acid chloride in 10 ml. of benzene was added dropwise to the stirred amine solution at about 15–20° C. The resulting mixture was then stirred for an additional 4 hours at room temperature. After standing overnight at room temperature, the reaction mixture was poured into about 60 ml. of water, the benzene layer was separated and then dried over magnesium sulfate. After removal of the magnesium sulfate by filtration, about 100 ml. of n-hexane was added to the dried benzene solution. The solution was chilled, and the crystallized product was removed by filtration to give 9.2 grams of N-(3,4-dichlorophenyl)cyclobutanecarboxamide, M.P. 100–102° C. Recrystallization from an n-hexane-ethyl acetate mixture raised the melting point to 102–104° C.

The following examples describe the preparation of additional cyclobutanecarboxamides according to the general procedure of Example 1.

EXAMPLE 2

N-(3-chlorophenyl)cyclobutanecarboxamide was prepared by the reaction of cyclobutanecarboxylic acid chloride with 3-chloroaniline. The purified product melted at 98–99° C.

EXAMPLE 3

N-(4-nitrophenyl)cyclobutanecarboxamide was prepared by the reaction of cyclobutanecarboxylic acid chloride with p-nitroaniline. The purified product melts at 124–125° C.

EXAMPLE 4

N-cyclohexylcyclobutanecarboxamide was prepared by the reaction of cyclobutanecarboxylic acid chloride with cyclohexylamine. The purified product melted at 113–116° C.

EXAMPLE 5

N-(4-chloro-2-butynyl)cyclobutanecarboxamide was prepared by the reaction of cyclobutanecarboxylic acid chloride with 4-chloro-2-butynylamine. The purified product melted at 60–61° C.

EXAMPLE 6

N-n-hexylcyclobutanecarboxamide was prepared by the reaction of cyclobutanecarboxylic acid chloride with n-hexylamine. The product was distilled under reduced pressure and collected at 121–123° C./1 mm. Hg.

EXAMPLE 7

N,N-pentamethylenecyclobutanecarboxamide was prepared by the reaction of cyclobutanecarboxylic acid chloride with piperidine. The product was distilled under reduced pressure and collected at 89° C./1 mm.

EXAMPLE 8

N,N-(3-oxapentamethylene)cyclobutanecarboxamide was prepared by the reaction of cyclobutanecarboxylic acid chloride with morpholine. The product was distilled under reduced pressure and collected at 96° C./1 mm.

EXAMPLE 9

N-(2-thiazolyl)cyclobutanecarboxamide was prepared by the reaction of cyclobutanecarboxylic acid chloride with 2-aminothiazole. The purified product melted at 132–134° C.

EXAMPLE 10

N-phenylcyclobutanecarboxamide was prepared by the reaction of cyclobutanecarboxylic acid chloride with aniline. The purified product melted at 109–110° C.

EXAMPLE 11

N-(2-pyridyl)cyclobutanecarboxamide was prepared by the reaction of cyclobutanecarboxylic acid chloride with 2-aminopyridine. The product was distilled under reduced pressure and collected at 125–128° C./1 mm.

EXAMPLE 12

Cyclobutanecarboxamide was prepared by the reaction of cyclobutanecarboxylic acid chloride with ammonia. The resulting product melted at 153–155° C.

EXAMPLE 13

N-α-naphthylcyclobutanecarboxamide was prepared by the reaction of cyclobutanecarboxylic acid chloride with α-naphthylamine. The purified product melted at 147–147.5° C.

EXAMPLE 14

N-benzylcyclobutanecarboxamide was prepared by the reaction of cyclobutanecarboxylic acid chloride with benzylamine. The purified product melted at 76–77° C.

EXAMPLE 15

N-allylcyclobutanecarboxamide was prepared by the reaction of cyclobutanecarboxylic acid chloride with allylamine. The purified product melted at 54–55.5° C.

EXAMPLE 16

N-tert.-butylcyclobutanecarboxamide was prepared by the reaction of cyclobutanecarboxylic acid chloride with tert.-butylamine. The purified product melted at 124–125° C.

As hereinbefore stated, the 1-cyclobutylformamides of this invention exhibit excellent plant growth regulatory properties when applied to the locus of plants, such as the foliage of the growing plant or the plant growth medium, as for example soil in which the plant is growing or is to be grown.

The following example shows the activity of representative compounds of this invention as post-emergence herbicides at a 5 pounds per acre rate of application.

Example A

A water suspension of the chemical was prepared by combining 0.4 gram of the chemical to be tested with 4 ml. of a solvent mixture (3 parts Emulphor EL–719 combined with one part xylene and one part kerosene) and then adding sufficient warm water to make 40 ml. of mixture. Emulphor EL–719 is described as a polyoxyethylated vegetable oil.

Oats, wheat, peas, radish, flax, alfalfa, tomatoes, millet and sugar beets were planted in 4″ pots in the greenhouse. Ten to eighteen days after the emergence of the plants, they were sprayed with the above prepared water emulsions at a rate of 5 pounds of the active chemical per acre and a spray volume of 60 gallons per acre. Seven days after application, the plants were observed and the results of treatment recorded as in Table A.

The plants were rated as follows:

| | |
|---|---|
| C=chlorosis | 1=slight effect |
| N=necrosis | 2=moderate effect |
| G=growth inhibition | 3=severe effect |
| K=non-emergence | 4=maximum effect or dead plants |
| 0=no effect | |

TABLE A

| Compound | Oats | Wheat | Peas | Radish | Flax | Millet | Alfalfa | Tomato | Sugar Beets |
|---|---|---|---|---|---|---|---|---|---|
| N-phenylcyclobutanecarboxamide | N2 | 0 | 0 | N2 | N2 | N3 | N1 | N3 | N1 |
| N-(3-chlorophenyl)cyclobutanecarboxamide | N1 | N1G1 | C3 | N3 | N2 | N3 | N3 | C1N1 | N3 |
| N-(3,4-dichlorophenyl)cyclobutanecarboxamide | N2G1 | N2G3 | C3N2 | N3 | N3 | 4 | 4 | C1N2 | 4 |
| N-(4-nitrophenyl)cyclobutanecarboxamide | N1 | 0 | 0 | N2 | N2 | N1 | N1 | N2 | N2 |
| N-cyclohexyl cyclobutanecarboxamide | N1 | 0 | N1 | N2 | N2 | N1 | N2 | N2 | N2 |
| N-(4-chloro-2-butynyl)cyclobutanecarboxamide | N1 | N2 | N2 | N1 | N2 | N2 | N1 | N2 | N1 |
| N-n-hexylcyclobutanecarboxamide | 0 | 0 | N1 | N1 | N1 | N1 | 0 | 0 | N3 |
| N,N-pentamethylenecyclobutanecarboxamide | 0 | 0 | 0 | N1 | N1 | N1 | 0 | 0 | 0 |
| N,N-(3-oxapentamethylene)cyclobutanecarboxamide | 0 | 0 | 0 | N1 | N1 | 0 | 0 | 0 | 0 |

The following example illustrates the activity of representative compounds of this invention as pre-emergence herbicides at a 20 pounds per acre rate of application.

Example B

An acetone solution of the chemical to be tested was prepared by dissolving 290 mg. of the chemical in 200 ml. of acetone.

Disposable paper half-flats were seeded and sprayed with the acetone solutions at a rate to give 20 lbs. of the active compound per acre. One flat, which had been seeded with alfalfa, brome, flax, oats, radishes and sugar beets, was held at 75° F. day temperature; another flat which had been seeded with corn, coxcomb, cotton, crabgrass, millet and soybeans was held at 85° F. Twenty-one days after seeding and treatment the flats were examined, plant emergence and chemical effects on the seedlings were rated and recorded as in Table B. The rating system was the same as in Example A.

TABLE B

| Compound | Alfalfa | Brome | Flax | Oats | Radish | Sugar Beets | Corn | Coxcomb | Cotton | Crabgrass | Millet | Soybeans |
| --- | --- | --- | --- | --- | --- | --- | --- | --- | --- | --- | --- | --- |
| N-(3-chlorophenyl)cyclobutanecarboxamide | K4 | 0 | G3 | 0 | N4 | 0 | G1 | K4 | 0 | 0 | K3 | G3 |
| N-(3,4-dichlorophenyl)cyclobutanecarboxamide | K4 | 0 | K2 | 0 | N4 | N4 | 0 | K4 | 0 | G2 | K4 | G3 |
| N-(4-nitrophenyl)cyclobutanecarboxamide | N2 | N2 | N1 | N2 | N4 | N2 | 0 | N4 | K2 | G2 | G2 | G2 |
| N-cyclohexyl cyclobutanecarboxamide | N4 | N1 | 0 | 0 | G2 | 0 | 0 | K4 | K2 | 0 | 0 | G2 |
| N-n-hexylcyclobutanecarboxamide | 0 | 0 | 0 | 0 | 0 | 0 | 0 | K4 | 0 | 0 | 0 | 0 |
| N,N-(3-oxapentamethylene)cyclobutanecarboxamide | N2 | N2 | N2 | N2 | N2 | N4 | N2 | N2 | N2 | N2 | N2 | N2 |
| N-(2-thiazolyl)cyclobutanecarboxamide | N4 | N2 | G2 | N1 | G1 | N1 | 0 | K4 | N2 | G2 | G2 | G2 |
| N-(2-pyridyl)cyclobutanecarboxamide | G2 | N1 | G2 | G1 | G1 | 0 | N3 | N1 | G1 | G3 | G3 | G3 |
| Cyclobutanecarboxamide | G3 | 0 | K3 | N1 | 0 | 0 | 0 | K3 | K3 | 0 | 0 | K2 |

The N-(monocyclic aryl)cyclobutanecarboxamides are especially useful as herbicides. Examples of compounds in this group are the N-phenyl cyclobutanecarboxamides in which the phenyl radical is unsubstituted or has nuclear substituents such as chloro, fluoro, bromo, cyano, lower alkyl, and lower alkoxy.

The presently preferred herbicidal compounds are the novel compounds having the formula

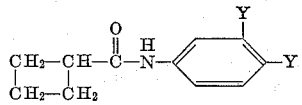

wherein Y represents a hydrogen, halo or methyl radical, at least one of said Y's being a halo radical. Examples of new compounds represented by this formula are N-(3-chlorophenyl)cyclobutanecarboxamide,
N-(4-chlorophenyl)cyclobutanecarboxamide,
N-(3-chloro-4-methylphenyl)cyclobutanecarboxamide,
N-(3-fluorophenyl)cyclobutanecarboxamide,
N-(4-bromophenyl)cyclobutanecarboxamide, and
N-(3,4-dichlorophenyl)cyclobutanecarboxamide.

The presently preferred compound is N-(3,4-dichlorophenyl)cyclobutanecarboxamide.

An application rate of about 40 pounds to as little as about 0.25 pound of one or more of the active compounds per acre is used. When the compounds are used as a preemergence herbicide, an application rate of about 5 to about 40 pounds per acre is used, with about 10 to about 20 pounds per acre being preferred. When they are used as a post-emergence herbicide, an application rate of about 0.25 to 40 pounds of one or more active compounds per acre is used, with an application rate of about 1 to 10 pounds per acre being preferred. When using a water emulsion of the herbicide, a spray volume of about 1 to about 100 gallons of aqueous emulsion, and preferably about 5 to 40 gallons, per acre is used.

By proper formulation and use of low application rates, the compounds of this invention can be used as selective herbicides to kill certain species of weeds in the presence of other crops.

The excellent herbicidal activity of the 1-cyclobutylformamides of this invention requires the application of only small amounts of the active ingredient distributed uniformly over a wide area. Of course, this is difficult to do employing the pure material. However, by increasing the bulk of this material, such as by mixing the compound with an inert diluent or carrier, the application to growing plants and soil can be achieved more readily. Such carriers may be either solids, such as talc, clay, diatomaceous earth, sawdust, calcium carbonate or the like, or liquids such as water, kerosene, acetone, benzene, toluene, xylene, and the like, in which the active compound may be dissolved or dispersed.

Emulsifying agents preferably are used to achieve a suitable emulsion or dispersion in liquids such as water to give aqueous sprays. Emulsifying agents and wetting agents may also be used to aid in dispersing the active compound in liquids used as the carrier in which the compound is not completely soluble and to increase coverage by the active compound. Emulsifying agents and wetting agents, also known as "surface active agents," are sold under numerous trademarks and may be either pure compounds, mixtures of compounds of the same general group, or they may be mixtures of compounds of different classes.

There are thus also provided by this invention novel herbicidal compositions containing one or more of the described 1-cyclobutylformamides intimately dispersed with or dissolved in a surface active agent. Typical satisfactory surface active agents which may be used are the alkali metal higher alkylarylsulfonates such as sodium dodecylbenzenesulfonate and the sodium salts of alkylnaphthylene sulfonic acids, fatty alcohol sulfates such as the sodium salts of the monoesters of sulfuric acid with n-aliphatic alcohols containing about eight to eighteen carbon atoms, long chain quaternary ammonium compounds, sodium salts of petroleum derived alkylsulfonic acids, polyethylene sorbitan monooleate, alkylarylpolyether alcohols, water-soluble lignin sulfonate salts, alkali-casein compositions, long chain alcohols usually containing about ten to eighteen carbon atoms, and condensation products of ethylene oxide with fatty acids, alkylphenols and mercaptans.

Other additives such as a lanolin or kerosene emulsion, or Tween-20 (a product described as sorbitan monolaureate polyoxyalkylene derivative), stickers and other auxiliary materials may be included in solid or liquid formulations to increase coverage of the active compound. These materials are also considered to be surface active agents.

Various changes and modifications of the invention can be made and to the extent that such variations incorporate the spirit of this invention they are intended to be included within the scope of the appended claims.

What is claimed is:
1. The method of controlling plant growth which comprises applying to the locus of the plant from about 1 to 10 pounds per acre of N-(4-chloro-2-butynyl)cyclobutanecarboxamide in combination with a surface active agent and an inert diluent.
2. The method of controlling plant growth which comprises applying to the locus of the plant from about 1 to 10 pounds per acre of N-(n-hexyl)cyclobutanecarboxamide in combination with a surface active agent and an inert diluent.
3. The method of controlling plant growth which comprises applying to the locus of the plant from about 1 to 10 pounds per acre of N-cyclohexyl cyclobutanecarboxamide in combination with a surface active agent and an inert diluent.

4. The method of controlling plant growth which comprises applying to the locus of the plant from about 10 to 20 pounds per acre of N-(2-thiazolyl)cyclobutanecarboxamide in combination with a surface active agent and an inert diluent prior to emergence of plant growth from the soil.

References Cited by the Examiner

UNITED STATES PATENTS

| | | | |
|---|---|---|---|
| 2,441,498 | 5/1948 | Lofgren et al. | 260—557 XR |
| 2,670,371 | 2/1954 | Cusic | 260—557 |
| 2,677,705 | 5/1954 | Utzinger | 260—557 |
| 2,723,192 | 11/1955 | Todd | 71—2.6 |
| 2,764,478 | 9/1956 | Searle | 71—2.6 |
| 2,866,801 | 12/1958 | Himel et al. | 260—557 XR |

OTHER REFERENCES

German Auslegeschrift, 2 pages, 1,005,784, April 4, 1957.

WALTER A. MODANCE, *Primary Examiner.*

IRVING MARCUS, DUVAL T. McCUTCHEN,
*Examiners.*

ROBERT L. PRICE, NATALIE TROUSOF,
*Assistant Examiners.*